United States Patent [19]
Yung et al.

[11] Patent Number: 5,870,388
[45] Date of Patent: Feb. 9, 1999

[54] RADIO CONFERENCING METHOD AND APPARATUS

[75] Inventors: Weng Ho Yung; Kin Mun Lye; Teck Chien Pek; Wee Peng Goh, all of Singapore, Singapore

[73] Assignee: National University of Singapore, The, Singapore, Singapore

[21] Appl. No.: 685,691

[22] Filed: Jul. 24, 1996

[30] Foreign Application Priority Data

Jul. 25, 1995 [SG] Singapore .......................... 9500940-3

[51] Int. Cl.[6] ...................................................... H04Q 7/20
[52] U.S. Cl. ........................... 370/260; 370/347; 370/349
[58] Field of Search ........................... 370/260, 312–349, 370/441–448, 459, 461, 462

[56] References Cited

U.S. PATENT DOCUMENTS 4,979,168  12/1990  Courtois et al. ........................ 370/349
5,594,948   1/1997  Talarmo et al. ........................ 455/518

OTHER PUBLICATIONS

K. Joseph et al., "Analysis of Generalized Retransmission Backoff Policies for Slotted–ALOHA Multiaccess Channels," IEEE International Conference on Communications '88: Digital Technology–Spanning the Universe (Cat. No. 88CH2538-7), vol. 1, pp. 430–436, Jul. 1988.

*Primary Examiner*—Melvin Marcelo
*Attorney, Agent, or Firm*—Mark R. Wisner

[57] ABSTRACT

A radio conferencing method and apparatus for transmitting packets of data from a plurality of radios over a transmission channel within a series of frames of predetermined duration, each packet of data having a predetermined time length, which method comprises the steps of: sensing the status of the channel; if the channel is idle, then transmitting the packet of data; if the channel is busy with another packet of data being sent, then disposing the packet of data and re-scheduling the transmission of the next packet of data to a time equal to a fraction of the time length of the packet of data plus the duration of the frame; and repeating the above steps.

12 Claims, 2 Drawing Sheets

RADIO CONFERENCING METHOD AND APPARATUS

THIS INVENTION relates to a method and apparatus for allowing radio conferencing.

Using conventional radio communication in a communication group of, for example, four two-way radios, only one radio is able to transmit at any one time and it is necessary to establish a spoken protocol to prevent more than one radio transmitting at any one time.

The present invention seeks to provide a solution to the above problem.

Accordingly, one aspect of the present invention provides a radio conferencing method for transmitting packets of data from a plurality of radios over a transmission channel within a series of frames of predetermined duration, each packet of data having a predetermined time length, which method comprises the steps of: sensing the status of the channel; if the channel is idle, then transmitting the packet of data; if the channel is busy with another packet of data being sent, then disposing of this packet of data and re-scheduling the transmission of the next packet of data to a time equal to a fraction of the time length of the packet of data plus the duration of the frame; and repeating the above steps until a packet of data is sent.

A further aspect of the present invention provides an apparatus for radio conferencing over a transmission channel comprising: a modulator to packetise voice data into packets of data; a transmitter for transmitting packets of data in the duration of a frame time; carrier sense means to determine the status of the transmission channel; delay means actuable upon the transmission of a packet of data over the transmission channel, when the channel is busy, to re-schedule the next transmission of a packet of data to a time equal to a fraction of the time length of a packet of data plus the duration of a frame after the previous transmission.

In order that the present invention may be more readily understood, embodiments thereof will now be described, by way of example, with reference to the accompanying drawings, in which.

Figure 1:
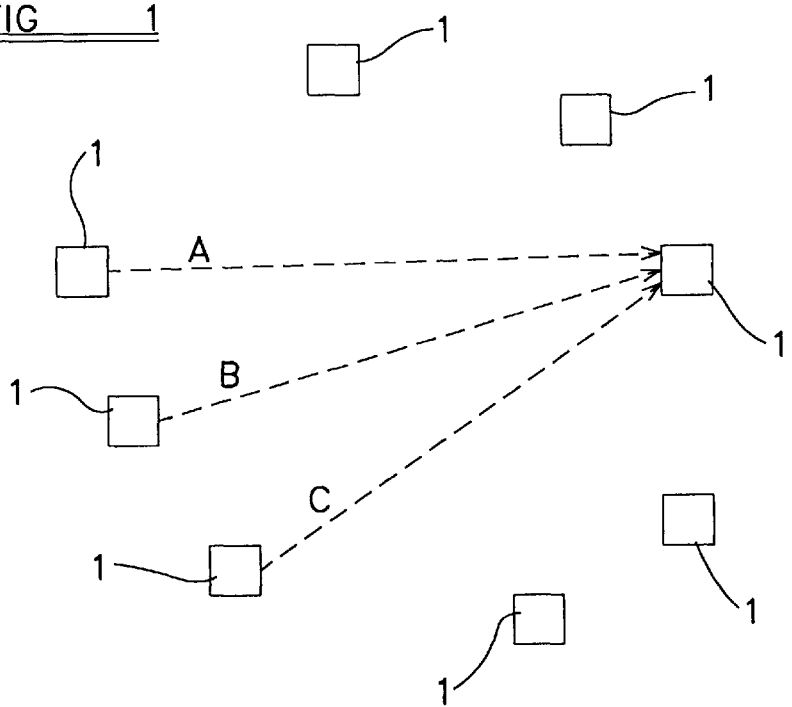
FIG. 1 is a schematic representation of a plurality of radios embodying the present invention in communication with one another.

Referring to FIG. 1, a plurality of two-way radios 1 embodying the present invention are shown. Each radio 1 comprises means to digitise speech such as a Continuous Variable Slope Delta (CVSD) modulator which, for example, provides a digitised signal sampled at 16 kbps (KHz). This sampling rate is known as the digitised voice bit rate (DVBR).

Figure 2:
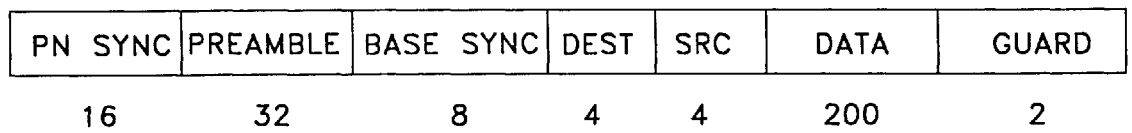
FIG. 2 shows the format of a data packet for use with the present invention.

The digitised speech signal is broken up into discrete data blocks of two hundred bits and each data block is supplemented with sixteen pseudo-random synchronisation bits and other relevant header information bits as shown in FIG. 2. In particular, thirty two preamble bits, a sync word of eight bits, a destination code of four bits and a source code of four bits are provided in the header. Two guard bits are provided at the end of the two hundred data bits.

The data bits together with the header information and the guard bits comprise a packet of data which is to be transmitted by the radio 1. Accordingly, the total size of each packet is 266 bits including the data group of 200 bits.

The packets of data are transmitted at a bit rate of 129 kbps (KHz) but are each mixed with a maximal length pseudo-random code sequence of thirty one chips to spread the transmitted signal power over a bandwidth of 4 MHz. Thus, the time taken to transmit a single packet of data is 2.06 ms (266/129 KHz). The rate at which the data is transmitted before mixing is known as the Channel Bit Rate (CBR). The 4 MHz bandwidth radio signal is transmitted at a centre frequency of 915 MHz. Preferably, the transmitted power of each radio 1 is 100 mW.

Figure 3:
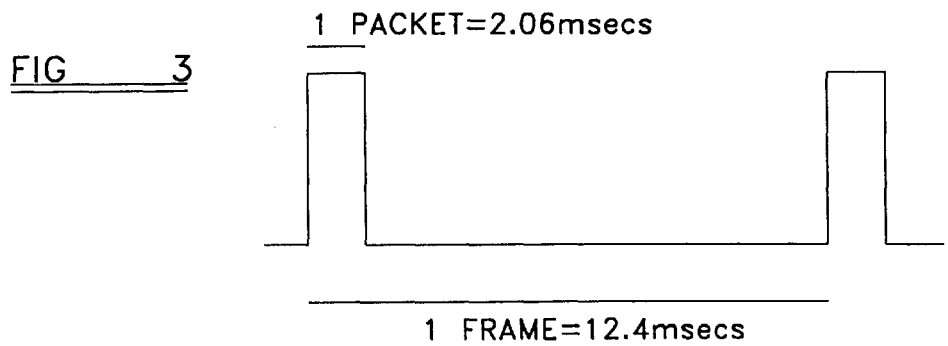
FIG. 3 illustrates a data packet being transmitted in the duration of a frame.

A frame structure is provided within which packets of data are to be transmitted. Each frame has a predetermined duration which is set to accommodate the transmission of a plurality of discrete packets of data within a single frame and, in the present example, is set to 12.4 ms. Referring to FIG. 3, one packet of data from a first radio 1 is shown being transmitted within each frame.

As can be seen from FIG. 3, there is a space between the first and second packets of data—approximately 10.34 ms in duration—in which the transmission channel is idle. Of course, the transmission channel is busy whilst packets of data are being transmitted by the first radio.

A carrier sensor is provided in each radio embodying the present invention to determine whether the transmission channel is busy, i.e. packets of data are being transmitted, or idle, i.e. there is no activity on the transmission channel.

When a second radio embodying the present invention begins to transmit packets of data whilst the first radio is still transmitting, then the second radio embodying the present invention senses the status of the transmission channel. If the channel is idle, then the packet of data is transmitted. If the channel is busy, then the packet of data is disposed of and not transmitted. The second radio seeks to avoid further collisions of packets of data by re-scheduling or delaying the transmission of its packets of data when the transmission channel is not busy.

Because there is an inherent redundancy in voice data which allows understanding of a message even if the entire contents of the message are not received due to collisions of packets of data, it is permissible to allow a limited amount of collision.

The method used for the re-scheduling of transmissions provides that when a channel is sensed as busy, i.e. a packet of data is already being transmitted on the channel, then, whilst the scheduled packet of data is not transmitted, the next packet of data will be re-scheduled for transmission at a time equal to a fixed fraction of the time length of the data packet plus the duration of a frame after the previous transmission. Subsequent packets from that radio will be transmitted a frame duration apart. In this manner, whilst there may well be a further collision of packets of data depending upon the value of the fixed fraction which is chosen, the number of collisions will be limited and the occasional loss of a few packets of data will not affect the recovery of the voice information.

Figure 4:
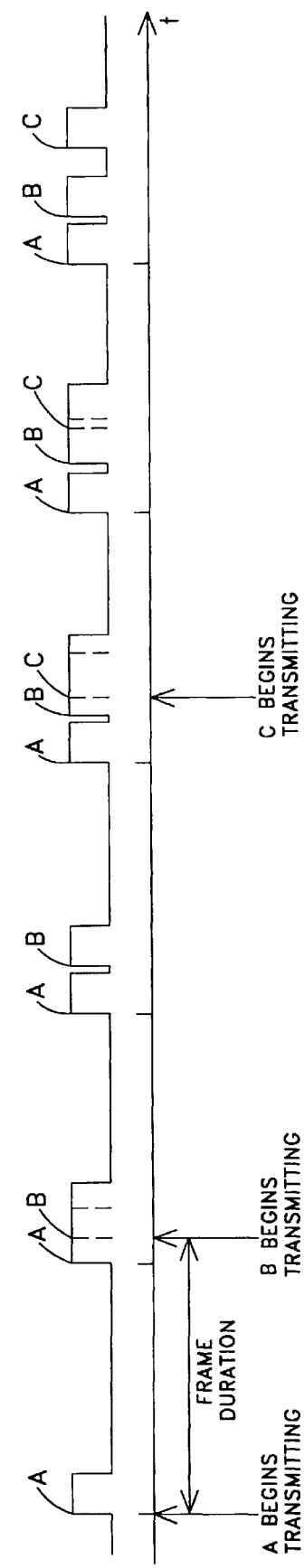
FIG. 4 illustrates a plurality of data packets being transmitted over a series of frame times.

As can be seen from the example of FIG. 4, a first radio 1 is transmitting packets of data A at a regular time in each frame. After the first transmission of a packet of data A, a second radio begins to transmit packets of data B. Should the first transmission of the packets of data B collide with the packets of data A, then the next transmission of a packet of data B will be re-scheduled to a fixed fraction of the time length of the packet of data plus the duration of a frame after the previous transmission. Collision occurs twice in the present example before the packets of data B are transmitted at a time when the channel is idle. The fixed fraction of the time length of the packet of data is 0.5 in this example.

When a third radio begins transmitting packets of data C (immediately after the second radio transmits packets of data B without collision with packets of data A), collisions occur with packets of data A and B. As collision is detected, the channel being busy, the method of re-scheduling transmissions of the packets of data C is used until no collisions occur.

As can be seen from the example shown in FIG. 4, a plurality of radios 1 can transmit their respective packets of data, the packets of data all being receivable by another radio. These packets of data, when received, can be de-packetised and de-modulated to reproduce the voices from the respective packets of data so that the receiving radio effectively provides simultaneous reception and reproduction of the original voice information from all of the transmitting radios. Thus, radio conferencing is possible.

The use of a time interval which is the duration of a frame plus a fixed fraction of the packet time provides sufficient spacing between packets to reduce the frequency of collision due to the so-called sliding effect. The sliding effect is caused by the radios in the conferencing group not being sychronised with one another, such that the length of time between transmission of respective packets of data can decrease or increase, resulting in the packets of data moving closer to one another in the duration of a frame and eventually colliding. Upon collision taking place, the aforementioned method is used to re-schedule the next transmission of one of the colliding packets of data to a time when no collision will take place.

There is a possibility that undetected collisions will occur. In the event that there is a delay in the propagation or detection of the status of a channel, or such delay is no longer negligible, then continuous undetected packet collision may occur, resulting in reception of incomprehensible information. This problem is, however, reduced by the fact that an operator of a radio in which the delay time for propagation or detection of a channel is not negligible is able to cease transmission and to try to transmit on the channel when the channel is idle.

Because the radios are unsynchronised, sliding collisions are inevitable but the provision of a higher channel bit rate (CBR) reduces the probability of such collisions.

The fixed fraction of the time length of the packet of data should be small enough so as not to increase the channel bit rate but large enough to reduce the frequency of sliding collisions. In a preferred embodiment, the fixed fraction of the time length of the packet of data is 0.5.

The recommended channel bit rate can be found using the following formula:

$$CBR = n \times MCS \times r \times DVBR \times (1/p)$$

where: CBR=channel bit rate
MCS=maximum number of conferencing stations
DVBR=digitised voice bit rate
n=1+f, f being the fixed fraction of the time length of the packet of data
r=the total number of bits per packet of data divided by the number of voice bits per packet of data
p=the probability that collisions due to delay will not occur In the preferred example, f is set as 0.5, n therefore being 1.5, the maximum number of conferencing stations, MCS, is 4, the total bits in a packet of data is 266, there are 200 voice bits per packet and assuming the probability that collision due to delay will not occur P is 1. Accordingly, a recommended channel bit rate of 127.6 KHz is arrived at. Thus, the channel bit rate might be set to, for example, 129 KHz.

In a preferred embodiment, a spreading module is provided to spread the packets of data by a 5-bit pseudo-random generator. As previously mentioned, each packet of data includes sixteen pseudo random synchronisation bits followed by the header and actual data bits. The sixteen pseudo-random synchronisation bits are learning bits consisting of sixteen bits of zero. Each learning bit is spread with thirty one chips at 4 Mbps, the resulting sequence being the plain pseudo-random code. This code is then differentially encoded using a differential phase shift keying (DPSK) encoder and transmitted. Thus, only the synchronisation bits are spread and then encoded. The rest of the bits of the packet are first encoded using a differential phase shift keying (DPSK) encoder and are then subsequently spread using a 5-bit pseudo-random generator for subsequent combination with the spread and encoded synchronisation bits for transmission at 915 MHz.

Figure 5:
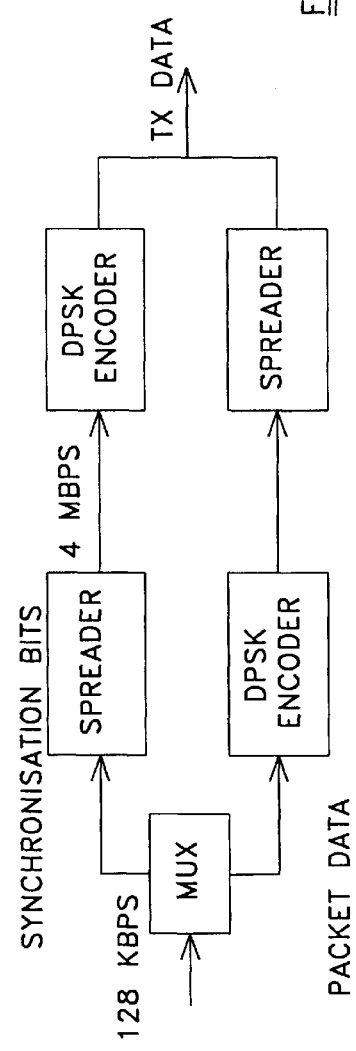
FIG. 5 is a schematic diagram of a spreading module for use with the present invention.

The module for effecting the above described method is shown in FIG. 5 and comprises a multiplexer for splitting the synchronisation bits from the rest of the packet data, a spreader and DPSK encoder for spreading and then encoding the synchronisation bits and a separate DPSK encoder and spreader for encoding and then spreading the rest of the packet of data for subsequent transmission with the spread and encoded synchronisation bits. The module thereby encloses and spreads the packets of data from 129 kbps to 4 MHz.

With regard to the radio receiving the transmitted packets, a chain of amplifiers receive the signal. A front end mixer and local oscillator down convert the 915 MHz signal to a 20 MHz intermediate frequency. The intermediate frequency signal is fed into a DPSK demodulator which recovers the 4 Mbps pseudo-random learning bits comprising the synchronisation bits at the header of the packet of data received. Using the recovered learning code, a pseudo-random code acquisition circuit will re-generate a synchronised pseudo-random code sequence, the local pseudo-random code. With the local pseudo-random code, the wide band signal of 4 MHz is despread with a mixer to obtain a narrow band PSK signal. The data from the narrow band PSK signal is recovered using conventional coherent detection methods and is sent to a baseband processing sub-system. Finally, the packet of data is channelled to one of three available CVSD decoders according to the source address in the header of the packet of data. Whilst the system according to the present example can support four voice transmissions, having only three CVSD decoders in each receiver means that only three simultaneous voice transmissions can be heard. This was assessed to be an acceptable number because, in normal group interaction, a third party would not normally speak when there are already two people talking. The design caters for three CVSD decoders, the third being configured to be a priority channel solely for the use of a high priority station thereby leaving the two other CVSD decoders for the use of the other radios in a group on a first come, first served basis. Parties who have established a channel to a particular CVSD decoder will continue to use that same decoder until that party ceases to transmit. At that time, the CVSD decoder will become free for another party to begin transmission.

With regard to the function of the other bits comprising the packet of data, the first sixteen pseudo-random synchronisation bits are zero and are used by the receiver to synchronise its pseudo random generator to the transmit pseudo-random generator. This is achieved by differentially encoding the pseudo-random coded synchronisation bits of transmission and at the receiver a pseudo-random code is then down-loaded to the pseudo-random generator of the receiver through a differential decoder.

The preamble comprise thirty-two bits of zero. These are used for phase locking the base band channel rate. The preamble and the subsequent bits in the packet are first differentially coded at base band before pseudo-random coding, unlike the first sixteen pseudo-random synchronisation bits.

The sync word is an eight bit code fixed as 0110110 for detection of packets of data. This is used in place of carrier sensing to indicate a busy channel.

The destination address comprises four bits and is used for providing the address of the destination radio. The source address comprises four bits and is used for station identification. The bits 1111 are specially reserved for use by a high priority station.

The two guard bits are used to prevent corruption of data due to sliding collision.

The foregoing describes but one presently preferred embodiment of the present invention and those skilled in the art will recognize from this disclosure that certain changes may be made to individual components described herein without departing from the manner in which the invention functions to achieve its intended result. All such changes are intended to fall within the spirit and scope of the following claims.

We claim:

1. A radio conferencing method for transmitting packets of data from a plurality of radios over a transmission channel within a series of frames of predetermined duration, each packet of data having a predetermined time length, which method comprises the steps of: sensing the status of the channel; if the channel is idle, then transmitting the packet of data; if the channel is busy with another packet of data being sent, then disposing of the packet of data and re-scheduling the transmission of the next packet of data to a time equal to a fraction of the time length of the packet of data plus the duration of the frame; and repeating the above steps.

2. A radio conferencing method according to claim 1, wherein the packets of data include digitised voice information.

3. A radio conferencing method according to claim 1, wherein each radio, when transmitting, transmits one packet of data within the duration of a frame.

4. A radio conferencing method according to claim 1, wherein the packets of data comprise a header portion and a data portion.

5. A radio conferencing method according to claim 4, wherein at least a part of the header portion is spread and subsequently encoded before transmission and the remainder of the header portion and the data portion is encoded and subsequently spread before transmission.

6. A radio conferencing method according to claim 5, wherein the encoding method is a differential phase shift keying (DPSK) encoding method.

7. A radio conferencing method according to claim 1, wherein the packets of data are spread from a channel bit rate before transmission to occupy a wider bandwidth than the channel bit rate.

8. A radio conferencing method according to claim 1, wherein the packets of data are packetised at a predetermined channel bit rate (CBR), a recommended value of which is derivable from the following equation:

$$CBR = n \times MCS \times r \times DVBR \times (1/p)$$

where: CBR=channel bit rate

MCS=maximum number of conferencing stations

DVBR=digitised voice bit rate n=1+f, f being the fixed fraction of the time length of the packet of data r=the total number of bits per packet of data divided by the number of voice bits per packet of data p=the probability that collisions due to delay will not occur.

9. A radio conferencing method according to claim 1, wherein the fraction of the time length of the packet of data is a fixed fraction.

10. A radio conferencing method according to claim 9, wherein the fraction of the time length of the packet of data is 0.5.

11. An apparatus for radio conferencing over a transmission channel comprising: a modulator to packetise voice data into packets of data; a transmitter for transmitting packets of data in the duration of a frame time; carrier sense means to determine the status of the transmission channel; delay means actuable upon the transmission of a packet of data over the transmission channel, when the channel is busy, to re-schedule the next transmission of a packet of data to a time equal to a fraction of the time length of a packet of data plus the duration of a frame after the previous transmission.

12. An apparatus according to claim 11 comprising a receiver for receiving signals transmitted over the transmission channel, which receiver has a plurality of demodulators each for demodulating packets of data from a respective transmitter.

* * * * *